United States Patent
Sachdev et al.

(10) Patent No.: US 10,465,603 B1
(45) Date of Patent: Nov. 5, 2019

(54) TURBOCHARGER SHAFTS WITH INTEGRATED COOLING FANS AND TURBOCHARGERS COMPRISING THE SAME

(71) Applicant: GM GLOBAL TECHNOLOGY OPERATIONS LLC, Detroit, MI (US)

(72) Inventors: Anil K. Sachdev, Rochester Hills, MI (US); Tyson W. Brown, Royal Oak, MI (US)

(*) Notice: Subject to any disclaimer, the term of this patent is extended or adjusted under 35 U.S.C. 154(b) by 0 days.

(21) Appl. No.: 16/052,029

(22) Filed: Aug. 1, 2018

(51) Int. Cl.
| | |
|---|---|
| F02B 39/00 | (2006.01) |
| F16C 3/02 | (2006.01) |
| F02C 6/12 | (2006.01) |
| F02B 39/14 | (2006.01) |
| F01D 25/12 | (2006.01) |
| F04D 29/58 | (2006.01) |
| F01D 5/08 | (2006.01) |
| F04D 29/52 | (2006.01) |

(52) U.S. Cl.
CPC .............. F02B 39/005 (2013.01); F01D 5/08 (2013.01); F01D 5/085 (2013.01); F01D 5/087 (2013.01); F01D 25/12 (2013.01); F01D 25/125 (2013.01); F02B 39/14 (2013.01); F02C 6/12 (2013.01); F04D 29/528 (2013.01); F04D 29/5846 (2013.01); F16C 3/02 (2013.01); F05B 2240/61 (2013.01); F05B 2260/20 (2013.01); F05D 2240/61 (2013.01); F05D 2260/20 (2013.01)

(58) Field of Classification Search
CPC .......... F02B 39/005; F02B 39/14; F02C 6/12; F16C 3/02; F01D 25/12; F01D 25/125; F01D 5/08; F01D 5/085; F01D 5/087; F04D 26/528; F04D 26/5846; F05D 2240/61; F05D 2260/20; F05B 2240/61; F05B 2260/20
USPC ......................................................... 60/605.3
See application file for complete search history.

(56) References Cited

U.S. PATENT DOCUMENTS

| | | | | | |
|---|---|---|---|---|---|
| 2,117,131 | A | * | 5/1938 | Auger ....................... | F02C 6/12 |
| | | | | | 417/409 |
| 2,484,275 | A | * | 10/1949 | Eastman .................. | F01D 25/08 |
| | | | | | 417/370 |
| 2,854,296 | A | * | 9/1958 | Eberle .................... | F01D 25/125 |
| | | | | | 384/476 |
| 3,428,242 | A | * | 2/1969 | Rannenberg ........... | B64D 13/06 |
| | | | | | 415/180 |

(Continued)

*Primary Examiner* — Patrick D Maines
*Assistant Examiner* — Dapinder Singh

(57) ABSTRACT

Turbochargers include a compressor comprising a compressor body extending from a compressor back face and a plurality of blades extending from the compressor body, a turbine comprising a turbine body extending from a turbine back face and a plurality of blades extending from the turbine body, and a shaft coupled at a first end to the compressor back face and at a second end to the turbine back face. The shaft includes an internal passage extending from the first end towards the second end in fluid communication with the compressor blades and one or more fans disposed within the internal passage and configured to draw air toward the second end of the shaft. The internal passage of the shaft is in fluid communication with the compressor blades via one or more bleed air passages, which can be biased towards an outer diameter of the compressor body.

20 Claims, 3 Drawing Sheets

(56) References Cited

U.S. PATENT DOCUMENTS 5,113,670 A * 5/1992 McAuliffe ............ F01D 25/125
　　　　　　　　　　　　　　　　　　　　　417/406

* cited by examiner

TURBOCHARGER SHAFTS WITH INTEGRATED COOLING FANS AND TURBOCHARGERS COMPRISING THE SAME

INTRODUCTION

Engine turbochargers are commonly manufactured from iron or aluminum alloys through a casting and/or forging process. Turbocharger material and design contributes to the overall performance of an engine. A turbocharger is comprised of various parts combined to effectuate this performance enhancement. A turbine is the portion of the turbo charger exposed to engine exhaust gases. The turbine or turbine rotates as the exhaust gases pass through to the vehicle exhaust. A shaft extends from a central portion of the turbine and rotates with the turbine. A compressor is arranged at the opposing end of the shaft and is rotatable therewith. As the compressor spins, it pushes extra air and oxygen into the cylinders, thereby allowing them to burn additional fuel.

Engine manufacturers are encountering increasing demands to improve engine efficiencies and performance including, but not limited to, improving fuel economy, improving fuel combustion, reducing oil consumption and increasing exhaust temperature for subsequent use in catalytic conversion of exhaust gases.

SUMMARY

Provided are turbochargers, which include a compressor comprising a compressor body extending from a compressor back face and a plurality of blades extending from the compressor body, a turbine comprising a turbine body extending from a turbine back face and a plurality of blades extending from the turbine body, and a shaft coupled at a first end to the compressor back face and at a second end to the turbine back face. The shaft can include an internal passage extending from the first end towards the second end in fluid communication with the compressor blades and a fan disposed within the internal passage and configured to draw air toward the second end of the shaft. The fan can include a plurality of blades which extend radially outward from the center of the internal passage of the shaft. The fan can include a helical surface which extends axially within the internal passage of the shaft. The shaft can include a plurality of fans disposed axially in series within the internal passage of the shaft. The pressure at which each of the plurality of fans draws air toward the second end at of the shaft can increase as the distance of each fan relative to the second end of the shaft decreases. The internal passage of the shaft can be in fluid communication with the compressor blades via one or more bleed air passages. Each of the one or more bleed air passages can include an inlet which is biased towards an outer diameter of the compressor body. The fan position can be fixed relative to the shaft. The shaft further can include one or more air outlets disposed between the fan and the back face of the turbine body. The turbine body can include an axial passage in fluid communication with the internal passage of the shaft.

Provided are turbocharger compressor and shaft assemblies, which include a compressor comprising a compressor body extending from a compressor back face and a plurality of blades extending from the compressor body, and a shaft coupled at a first end to the compressor back face. The shaft can include an internal passage extending from the first end towards a second end of the shaft and in fluid communication with the compressor blades, and a fan disposed within the internal passage and configured to draw air toward the second end of the shaft. The fan can include a plurality of blades which extend radially outward from the center of the internal passage of the shaft. The fan can include a helical surface which extends axially within the internal passage of the shaft. The shaft can include a plurality of fans disposed axially in series within the internal passage of the shaft. The pressure at which each of the plurality of fans draws air toward the second end at of the shaft can increase as the distance of each fan relative to the second end of the shaft decreases. The internal passage of the shaft can be in fluid communication with the compressor blades via one or more bleed air passages. Each of the one or more bleed air passages can include an inlet which is biased towards an outer diameter of the compressor body. The fan position can be fixed relative to the shaft. The shaft further can include one or more air outlets disposed between the fan and the back face of the turbine body. The turbine body can include an axial passage in fluid communication with the internal passage of the shaft.

Although many embodiments are described in relation to lithium batteries and wired charging systems, batteries of various chemistries charged by wired and non-wired systems are germane to the disclosure herein. Other objects, advantages and novel features of the exemplary embodiments will become more apparent from the following detailed description of exemplary embodiments and the accompanying drawings.

DRAWINGS

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
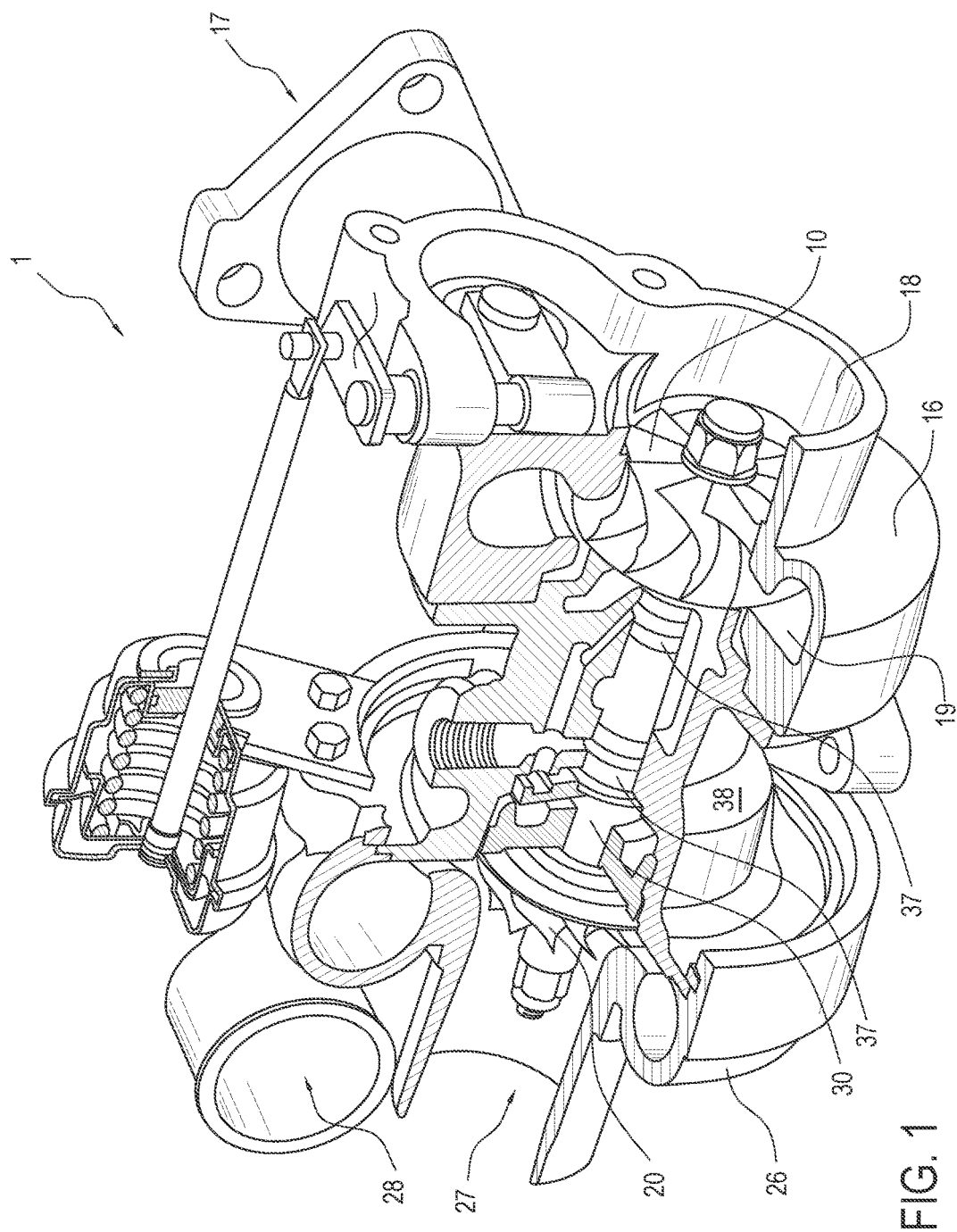
FIG. 1 illustrates a cross-sectional perspective view of a turbocharger, according to one or more embodiments.

FIG. 1 illustrates a perspective cutaway view of a turbocharger 1 which includes a turbine 10 disposed within a turbine housing 16, and a compressor 20 disposed within a compressor housing 26. The turbine 10 and the compressor 20 are mechanically coupled via a common rotatable shaft 30 which extends through a bearing housing 38. In operation, the turbine 10 receives, via a turbine exhaust intake 17, exhaust gas which is expelled, for example from an engine (not shown). The intake 17 can communicate exhaust gas to the circumferential volute, or scroll, 19 which receives the exhaust gases and directs the same to the turbine 10. Exhaust gas thereafter is expelled from the turbine housing 16 via an exhaust conduit 18. The turbine 10 captures kinetic energy from the exhaust gases and spins the compressor 20 via the common shaft 30. Volumetric restrictions of the exhaust gas within the turbine housing 16 convert thermal energy into additional kinetic energy which is similarly captured by the turbine 10. For example, volute 19 can be particularly optimized to effect the conversion of thermal energy to kinetic energy. The rotation of the compressor 20 via the common shaft 30 draws in air through the compressor intake 27 which is compressed and delivered to, for example, an engine intake manifold (not shown) via conduit 28. The turbocharger 1 increases the power output and/or volumetric efficiency of an appurtenant engine by increasing the oxygen concentration per unit volume of air delivered to one or more cylinders of the engine. Compressed air can pass through a downstream air cooler (not shown) before entering the intake manifold to maximize the oxygen concentration per unit volume of air delivered thereto.

The common shaft 30 is supported by one or more bearings 37 disposed within bearing housing 38. The one or more bearings 37, and/or other rotating components of the turbocharger 1, are lubricated by fluid, such as oil, to ensure efficient operation the turbocharger and prevent wear or damage to components thereof. The common shaft 30 and/or the bearings 37 are commonly cooled (e.g., liquid cooled) in order to prevent damages to the components and prevent undesired heat transfer from the turbine 10 side of the turbocharger 1 to the compressor 20 side.

Provided herein are turbochargers which each comprises a hollow common shaft with one or more fans disposed therein and configured to draw compressor air through the shaft towards the turbine. Such turbochargers minimize or prevent the transfer of undesired heat from the turbine side of the turbocharger to the compressor side, thereby increasing the oxygen concentration per unit volume of compressed air expelled from the compressor 20 (e.g., via conduit 28). The cooling effects of the turbochargers described herein further reduce the size and weight of components relating to shaft and/or bearing cooling systems and downstream compressor air coolers, and the power demands of such cooling systems (e.g., borne by appurtenant vehicle engines). Similarly, reducing or eliminating the need for liquid cooling systems reduces demand on integrated radiators. Accordingly, the performance of appurtenant engines and vehicles are improved.

Figure 2:
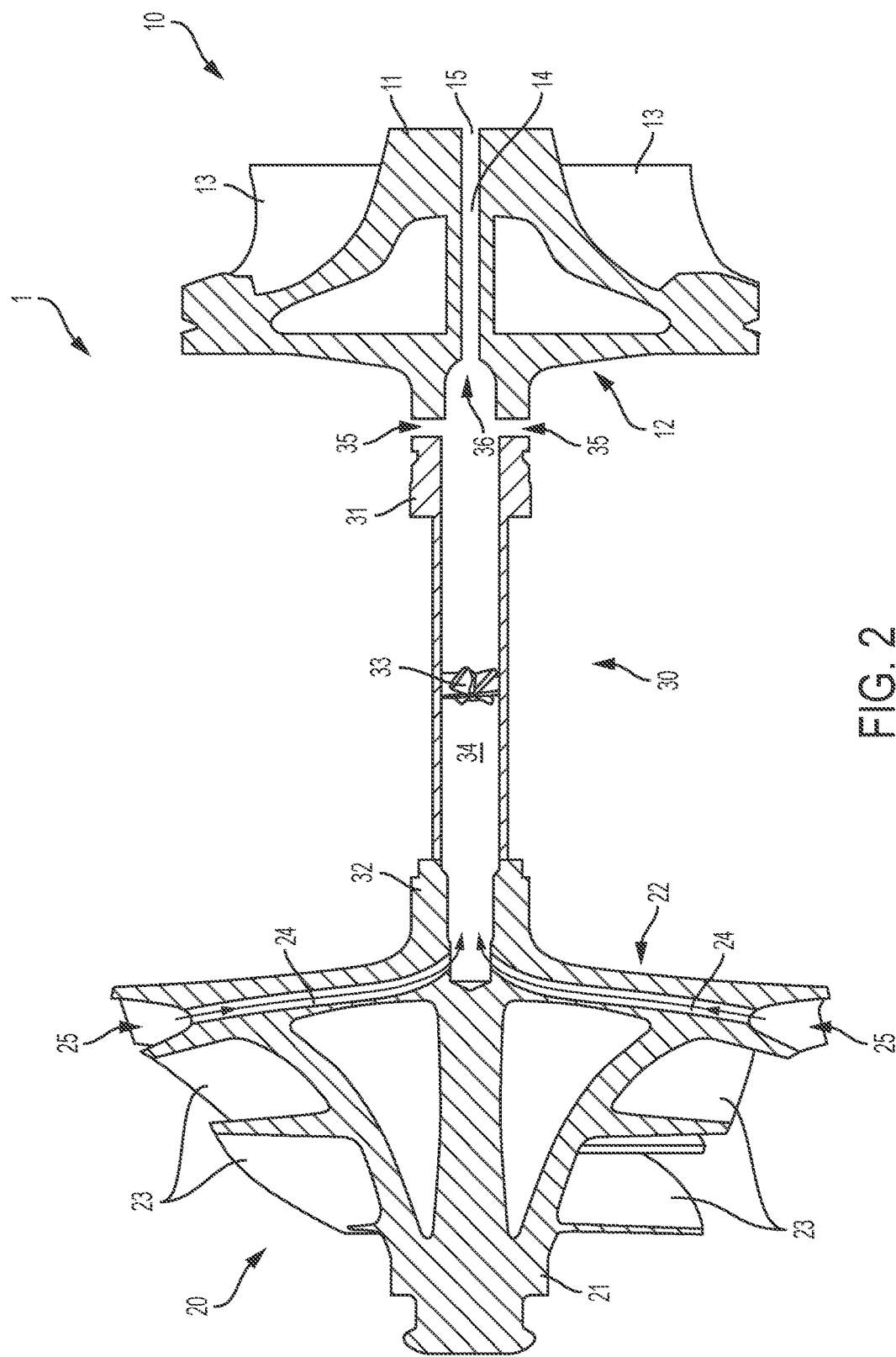
FIG. 2 illustrates a cross-sectional side view of a turbocharger, according to one or more embodiments.

FIG. 2 illustrates a cross sectional view of the turbocharger 1 including the turbine 10 and compressor 20 couple by the common shaft 30. The turbine 10, compressor 20, and the common shaft 30 are fixedly coupled such that they collectively rotate at the same speed. The turbine 10 comprises a turbine body 11 extending from a turbine back face 12, and a plurality of circumferentially arranged blades 13 extending from the turbine body 11. The turbine body 11 can be generally conical, such that its diameter is greatest proximate to the turbine back face 12. The compressor 20 comprises a compressor body 21 extending from a compressor back face 22, and a plurality of circumferentially arranged blades 23 extending from the compressor body 21. The compressor body 21 can be generally conical, such that its diameter is greatest proximate to the compressor back face 22. The turbine 10, compressor 20, and shaft 30 can be a one-piece construction, or the shaft 30 can be coupled at a first end to the compressor back face 22 and at a second end to the turbine back face 12. The shaft 30 may couple to the turbine 10 and the compressor 20 via respective collars 31 and 32, or directly to the turbine back face 12 and compressor back face, respectively, for example. It is understood that many geometric configurations and fabrication methods may be utilized to couple the turbine 10, compressor 20, and the common shaft 30. For the purposes of this disclosure, any portions of the turbine 10 or compressor 20 which extend from its respective back face towards the shaft 30 shall be considered part of the shaft 30.

The shaft 30 generally comprises an internal passage 34 extending from the first end of the shaft 30 towards the second end of the shaft 30. The shaft 30 further includes a fan 33 disposed within the internal passage 34. The fan can be fixed within the internal passage 34 relative to the shaft 30. The internal passage 34 is in fluid communication with the compressor blades 23 (i.e., in fluid communication with air delivered to the compressor 20 via the compressor intake 27) such that as the shaft 30, and accordingly the compressor 20, rotates, the fan 33 draws air toward the second end of the shaft. The fan 33 is configured to have a higher air suction capability, relative to the axis of the shaft 30, than the compressor 20 such that a desired amount of air is drawn into the internal passage 34 (i.e., instead of compressed and expelled through the conduit 28). The air drawn towards the second end of the shaft cools the shaft and appurtenant components such as the bearings 37. The internal passage 34 can be in fluid communication with the compressor blades 23 via one or more bleed air passages 24. Bleed air passages 24 can be formed within the compressor body 21 and include an inlet 25. Because the air pressure around the compressor 20 is greatest near the outer diameter of the compressor body 21, in some embodiments, the bleed air passage 24 inlets 25 are biased towards an outer diameter of the compressor body 21, as shown. Additionally or alternatively, as shown in FIG. 2, the one or more bleed air passages 24 can occur proximate to the compressor back face 22 to further assist with cooling the compressor 20. Other orientations of inlets 25 are additionally or alternatively within the scope of this disclosure. For example, inlets 25 can be disposed proximate the axis of the compressor body 21.

The shaft 30 can further comprise one or more air outlets disposed between the fan 33 and the back face 12 of the turbine body 11. The shaft 30 can comprise one or more radial vents 35, which, for example, can vent air drawn through the internal passage 34 via the fan 33 through the bearing housing 38. Additionally or alternatively, the shaft 30 can comprise an axial vent 36 at the second end of the shaft 30 proximate the back face 12 of the turbine. The axial vent 36 can be in fluid communication with an axial turbine passage 15 configured to axially vent air drawn through the shaft 30 via fan 33. The axial turbine passage 15 is centrally disposed within the turbine body 11 in order to minimize undesired cooling of the turbine 10 or nearby exhaust gas.

Figure 3A:
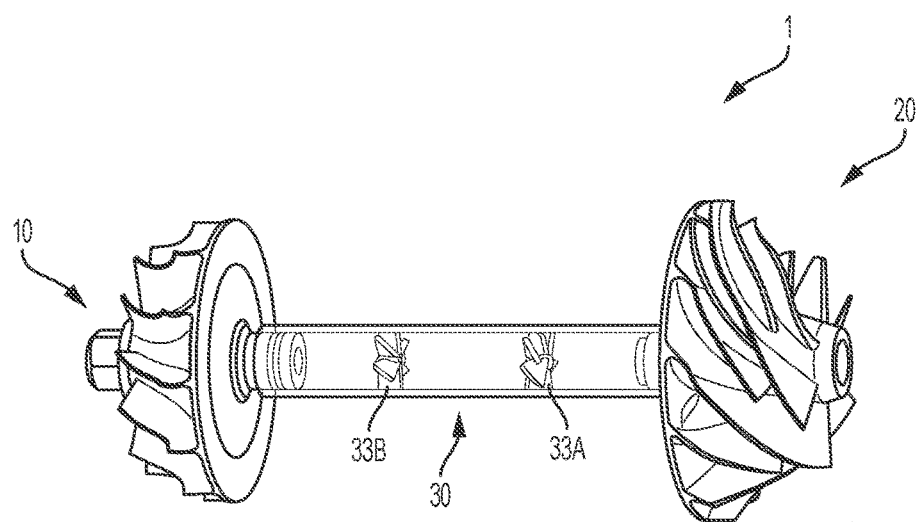
FIG. 3A illustrates a perspective view of a turbocharger, according to one or more embodiments.
Figure 3B:
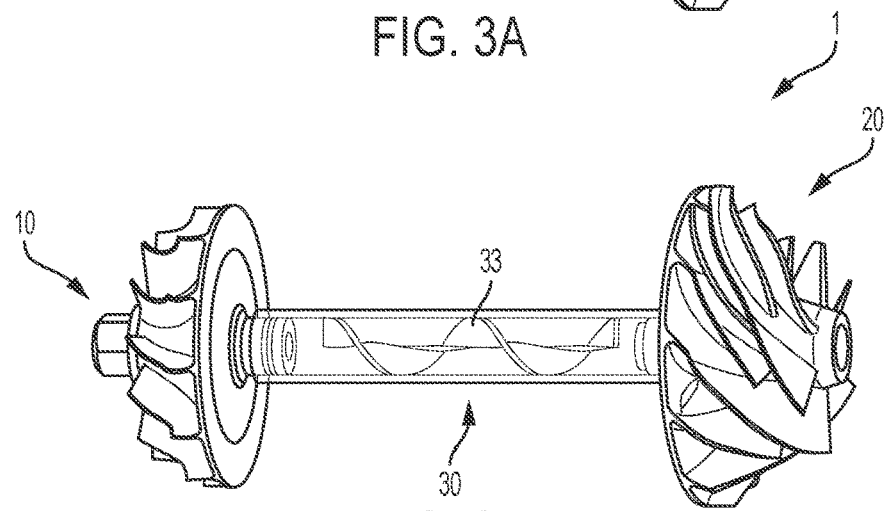
FIG. 3B illustrates a perspective view of a turbocharger, according to one or more embodiments.
Figure 3C:
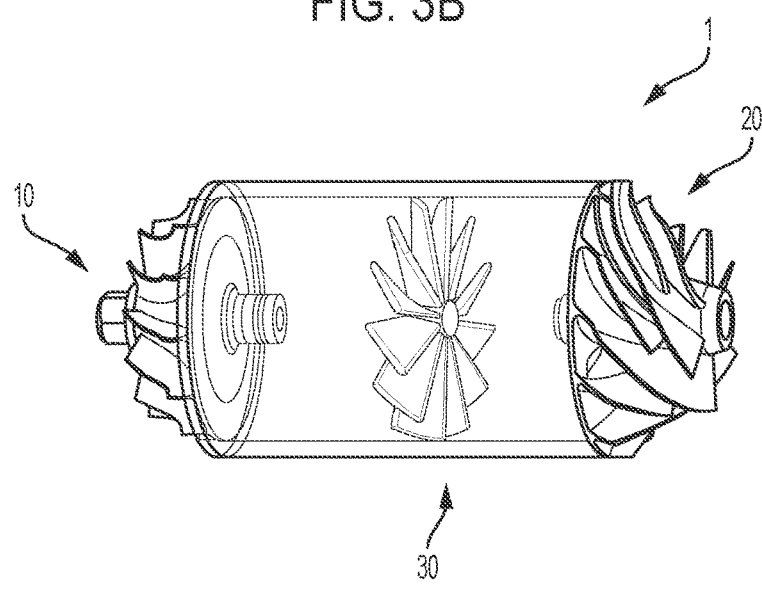
FIG. 3C illustrates a perspective view of a turbocharger, according to one or more embodiments.

The fan 33 as illustrated in FIG. 2 comprises a plurality of blades which extend radially outward from the center axis of the internal passage 34 of the shaft 30. FIGS. 3A-C illustrate various embodiments of shafts 30 and fans 33 appurtenant to the turbocharger 1. FIG. 3A illustrates a turbocharger 1 comprising a plurality of fans 33A, 33B disposed axially in series within the internal passage 34 of the shaft 30. Generally, for a turbocharger comprising a plurality of fans, the pressure at which each of the plurality of fans draws air toward the second end at of the shaft (i.e., toward the turbine 10) increases as the distance of each fan relative to the second end of the shaft decreases. Accordingly, in such an embodiment, the suction capability of fan 33B is greater than fan 33A. The pressure generating (i.e., suction) capability of each fan can be controlled based on the pitch or angle of the individual fan blades, for example. For example, the suction capability of a fan increases as the angular orientation of the blade plane deviates from a perpendicular orientation relative to the axis of the shaft 30.

FIG. 3B illustrates a turbocharger 1 comprising a fan 33 with a helical body which extends axially within the internal passage 34 of the shaft 30. FIG. 3C illustrates a turbocharger 1 comprising a shaft 30 with a diameter which is substantially equal to the maximum diameter of turbine 10 and/or the compressor 20. In some embodiments, turbocharger 1 comprises a shaft 30 with a diameter which is substantially equal to the smaller of the maximum diameter of turbine 10 and the maximum diameter of the compressor 20. The diameter of the shaft 30 can be chosen such that the assembly may be constructed in one piece. A wider diameter shaft 30, and accordingly internal passage 34, reduces the velocity of air flow within the internal passage 34 but increases the volumetric flow of air therein. Conversely, a narrower internal passage 34 reduces the volumetric flow rate of air within the internal passage 34, but increases the velocity of the air flow therein. The diameter of the shaft 30 and internal passage 34 can be optimized to meet the performance needs of a particular turbocharger 1 and appurtenant components.

The turbocharger components in the exemplary embodiments can be manufactured with a steel material during the additive manufacturing process or can be designed with many of the features presented above with an alternate material in place of steel. As such, it should be clear that this description is merely exemplary in nature and, thus, variations that do not depart from the gist of the disclosure are intended to be within the scope of the disclosure. Such variations are not to be regarded as a departure from the spirit and scope of the disclosure. While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A turbocharger, comprising:
   a compressor comprising a compressor body extending from a compressor back face and a plurality of blades extending from the compressor body;
   a turbine comprising a turbine body extending from a turbine back face and a plurality of blades extending from the turbine body; and
   a shaft coupled at a first end to the compressor back face and at a second end to the turbine back face, wherein the shaft includes:
      an internal passage extending from the first end towards the second end in fluid communication with the compressor blades, and
      a fan disposed within the internal passage and configured to draw air toward the second end of the shaft.

2. The turbocharger of claim 1, wherein the fan comprises a plurality of blades which extend radially outward from the center of the internal passage of the shaft.

3. The turbocharger of claim 1, wherein the fan comprises a helical surface which extends axially within the internal passage of the shaft.

4. The turbocharger of claim 1, wherein the shaft includes a plurality of fans disposed axially in series within the internal passage of the shaft.

5. The turbocharger of claim 4, wherein the pressure at which each of the plurality of fans draws air toward the second end at of the shaft increases as the distance of each fan relative to the second end of the shaft decreases.

6. The turbocharger of claim 1, wherein the internal passage of the shaft is in fluid communication with the compressor blades via one or more bleed air passages.

7. The turbocharger of claim 6, wherein each of the one or more bleed air passages comprise an inlet which is biased towards an outer diameter of the compressor body.

8. The turbocharger of claim 1, wherein the fan position is fixed relative to the shaft.

9. The turbocharger of claim 1, wherein the shaft further comprises one or more air outlets disposed between the fan and the back face of the turbine body.

10. The turbocharger of claim 1, wherein the turbine body comprises an axial passage in fluid communication with the internal passage of the shaft.

11. A turbocharger compressor and shaft assembly, the assembly comprising:
    a compressor comprising a compressor body extending from a compressor back face and a plurality of blades extending from the compressor body; and
    a shaft coupled at a first end to the compressor back face and including:
       an internal passage extending from the first end towards a second end of the shaft and in fluid communication with the compressor blades, and
       a fan disposed within the internal passage and configured to draw air toward the second end of the shaft.

12. The assembly of claim 11, wherein the fan comprises a plurality of blades which extend radially outward from the center of the internal passage of the shaft.

13. The assembly of claim 11, wherein the fan comprises a helical surface which extends axially within the internal passage of the shaft.

14. The assembly of claim 11, wherein the shaft includes a plurality of fans disposed axially in series within the internal passage of the shaft.

15. The assembly of claim 14, wherein the pressure at which each of the plurality of fans draws air toward the second end at of the shaft increases as the distance of each fan relative to the second end of the shaft decreases.

16. The assembly of claim 11, wherein the internal passage of the shaft is in fluid communication with the compressor blades via one or more bleed air passages.

17. The assembly of claim 16, wherein each of the one or more bleed air passages comprise an inlet which is biased towards an outer diameter of the compressor body.

18. The assembly of claim 11, wherein the fan position is fixed relative to the shaft.

19. The assembly of claim 11, wherein the shaft further comprises one or more air outlets disposed between the fan and the back face of the turbine body.

20. The assembly of claim 11, wherein the turbine body comprises an axial passage in fluid communication with the internal passage of the shaft.

* * * * *